United States Patent

[11] 3,626,895

| [72] | Inventor | David Enden |
| | | Kiryat Malachi, Moshav Dorot, Israel |
| [21] | Appl. No. | 857,999 |
| [22] | Filed | Sept. 15, 1969 |
| [45] | Patented | Dec. 14, 1971 |

[54] DEVICE FOR EXPOSING BURIED OBJECTS
2 Claims, 3 Drawing Figs.

[52] U.S. Cl. ........................................................ 111/6,
172/713
[51] Int. Cl. ........................................................ A01c 23/02
[50] Field of Search ............................................ 111/6–7.4,
85; 172/686, 696, 713, 378

[56] References Cited
UNITED STATES PATENTS

| 377,980 | 2/1888 | Bateman ...................... | 172/713 X |
| 1,029,679 | 6/1912 | Grieves ......................... | 111/85 |
| 1,717,911 | 6/1929 | Brewer ......................... | 111/7 |
| 2,968,266 | 1/1961 | Gustafson ..................... | 111/7 X |
| 3,099,898 | 8/1963 | Harris ........................... | 111/7 X |

FOREIGN PATENTS

| 514,840 | 11/1939 | Great Britain ................ | 111/7 |

*Primary Examiner*—Robert E. Bagwill
*Attorney*—Merchant and Gould

ABSTRACT: Apparatus for exposing a buried object comprising pronglike digging means for loosening the soil surrounding the buried object and means for projecting a stream of air toward the soil loosening end of the digging means for removing (i.e. for blowing away) the loosened soil.

Patented Dec. 14, 1971

3,626,895

INVENTOR.
DAVID ENDEN
BY
Merchant & Gould
ATTORNEYS

DEVICE FOR EXPOSING BURIED OBJECTS

This invention concerns an apparatus for exposing buried objects, such as roots of large crops; i.e., bushes, lost or placed objects, stones and the like.

Especially in the cultivation of trees it becomes often necessary to expose the roots in order to apply a treating substance to them. The roots must be exposed carefully so that they are not damaged.

It is therefore the object of the present invention to provide an apparatus for the purpose of exposing buried objects without causing damage to the object.

It is a further object of the present invention to provide an apparatus, which, while exposing such objects, particularly tree roots, is adapted to protect treating material onto said roots.

The invention consists of an apparatus for exposing buried objects, such as lost or placed objects, tree roots, stones and the like, comprising in combination a device for the projection of a stream of air or other gas or gases, and a device disposed in or adjacent to the path of the projected stream and adapted for operation as a digging means.

The apparatus is intended for use by projection of the air or gas stream for the purpose of removing or disturbing material which may be covering or adhering to the object. The digging means is intended for physical disturbance of material which may be covering or be adherent to the crop.

The projecting apparatus may be generally of the kind comprising a nozzle or other outlet and a means for supplying a stream of material to the nozzle or outlet, and a stream of air or other gas about the nozzle or outlet so as to carry the material along in a projecting stream.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
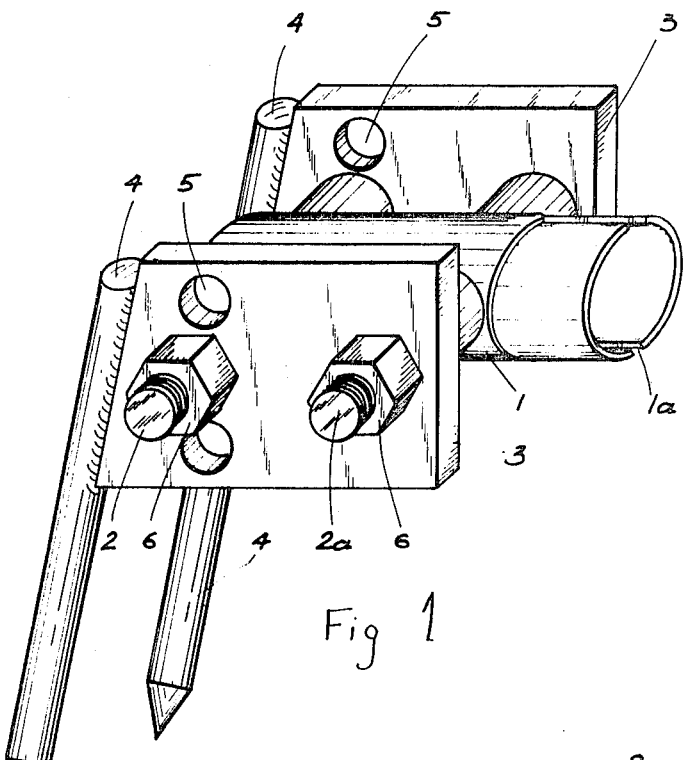
FIG. 1 is a perspective view of one embodiment of an apparatus for exposing buried objects according to the invention.

The apparatus for exposing objects according to the present invention comprises the air projection means constituted by a short tube 1 which with its trailing end, which is of reduced cross section and is provided with axial slots 1a, is adapted for connection with a source of pressurized air or other gas. Extending laterally, at diametrically opposed positions of tube 1, two pairs of threaded spaced studs 2, 2a are provided.

The digging means comprise two flat plates 3 to the slanted front ends of which downwardly extending prongs 4 are attached by welding or any other suitable means. The prongs may be attached at any suitable angle to the plates 3. The plates 3 are provided with one hole 5a (FIG. 3) at the trailing end and with three similar holes 5 at the leading end, said three holes 5 being located along a radius using the hole 5a at the trailing end as a center.

Plates 3 are attached to tube 1 in that studs 2a are inserted into holes 5a and studs 2 into one of the holes 5, whereupon nuts 6 as shown or if desired wing nuts, are screwed onto the studs to tighten the plate 3 in place. The angle of plate 3 relative to tube 1 may be changed by selecting one or the other of holes 5 for inserting and fastening stud 2.

When tube 1 is connected to the source of pressurized air and the apparatus is used in the field, the soil is loosened by a scraping and digging action with prongs 4 and the stream of air through tube 1 will blow the loosened soil away.

As a source of pressurized air or other gas, there may be utilized any convenient source such as a reservoir of compressed air or gas, or a means for creating a stream of pressured air or gas at the time of use. A reservoir source of pressurized air could be an air cylinder carried, for example, on the back of a worker operating the apparatus. Means for creating a stream of pressurized air or gas during operation of the apparatus could consist of a motorized blower, such as the back-pack blowers commonly used in crop-dusting, or a larger internal combustion engine. In a particularly convenient arrangement, use is made of the exhaust gas stream of an internal combustion engine; e.g., of a vehicle such as a tractor. The tube 1 is coupled to the exhaust pipe of the internal combustion engine, preferably by a flexible hose.

The apparatus can be used to apply a treating substance to the exposed roots by combining a supply of said substance, such as insecticides, for example, in the form of a dust or a liquid with the compressed airflow by any suitable known means. Furthermore, the tube 1 can be connected also to a stream of hot gases for the purpose of destroying weeds. Another application of the apparatus above described is for thinning crops, such as vegetable shoots and the like by digging up the unwanted shoots with the prongs 6 and then removing them with the airstream.

Figure 2:
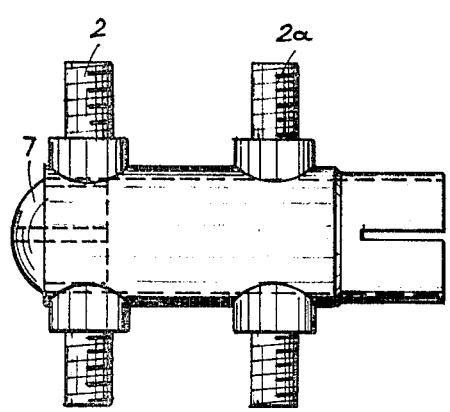
FIG. 2 is a plan view of another embodiment of the air projection means according to the invention.

The air projection means shown in FIG. 2 differs from that of FIG. 1 only in that an outlet nozzle 7 is inserted into the leading end of tube 1 in order to concentrate the airstream flowing through tube 1.

Figure 3:
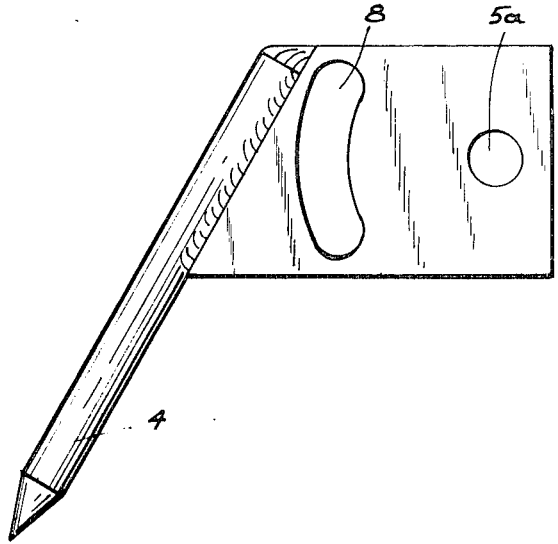
FIG. 3 is a side elevation of a second embodiment of the digging means.

In the embodiment of the digging means shown in FIG. 3 the holes 5 of FIG. 1 are replaced by an arcuate slot 8 for the relative adjustment between tube 1 and plate 3.

The prongs 4 may be connected to the tube 1 in any other suitable manner and may assume any suitable angle relative to it. Instead of two prongs 4, more than two may be utilized as digging means, or only one, in which case the stream of air will be projected adjacent to the digging means.

What is claimed is:

1. Digging apparatus for loosening and removing soil, comprising:
    a. gas projection means suitable for hand carrying and including a tubular member having a first end defining a gas outlet and a second end adapted for connection with a source of pressurized gas;
    b. at least one pair of studlike members attached to said tubular member so as to extend laterally outward therefrom in a generally diametrically opposed relationship;
    c. first and second platelike members attached to said tubular member on opposing sides thereof by said studs, said platelike members having openings therethrough, with said studs received therein, said openings being adapted to permit one to attach said platelike members at any one of various angles relative to said tube;
    d. an elongated, outwardly extending prong fixedly attached to each of said plates adjacent the first end of said tube and having an outermost end suitable for loosening soil; and
    e. said gas projection means further includes nozzle means attached to said gas outlet for concentrating the gas stream flowing through said tubular member and directing said stream toward said soil loosening ends of said prongs so as to act upon and remove the soil loosened thereby.

2. The digging apparatus of claim 1 including a pressurized gas cylinder suitable for carrying by the operator of the apparatus and flexible hose means connecting said pressurized gas cylinder to said second end of said tubular member.

* * * * *